United States Patent [19]

Barringer

[11] Patent Number: 4,517,458

[45] Date of Patent: May 14, 1985

[54] REMOTE DETECTION OF HYDROCARBON SEEPS

[76] Inventor: Anthony R. Barringer, 25060 Montane Dr. W., Golden, Colo. 80401

[21] Appl. No.: 324,248

[22] Filed: Nov. 23, 1981

[51] Int. Cl.³ .............................................. G01V 5/00
[52] U.S. Cl. .................................. 250/253; 250/461.1
[58] Field of Search .............. 250/253, 301, 372, 373, 250/461.1

[56] References Cited

U.S. PATENT DOCUMENTS

| | | | |
|---|---|---|---|
| 3,768,908 | 10/1973 | Zaromb | 250/372 |
| 3,899,213 | 8/1975 | Fantasia et al. | 250/301 |
| 3,961,187 | 6/1976 | Barringer | 250/253 |
| 4,213,044 | 7/1980 | Perrotta | 250/301 |

Primary Examiner—Janice A. Howell

[57] ABSTRACT

A method of detecting hydrocarbon seeps in a sea or in earth is disclosed. The method involves interrogating aerosols formed above the sea or earth surface with an intense beam of primary light radiation generated aboard an aircraft or other vehicle. The spectral composition of the beam is selected to induce secondary light radiation in certain hydrocarbon materials contained in aerosols generated by hydrocarbon seeps rising to the sea or earth surface. The secondary light radiation is detected aboard the aircraft and subjected to spectral analysis to determine whether the composition of the aerosols is characteristic of aerosols generated by hydrocarbon seeps. Apparatus for implementing the method is also disclosed.

18 Claims, 2 Drawing Figures

U.S. Patent    May 14, 1985    4,517,458
FIG.1
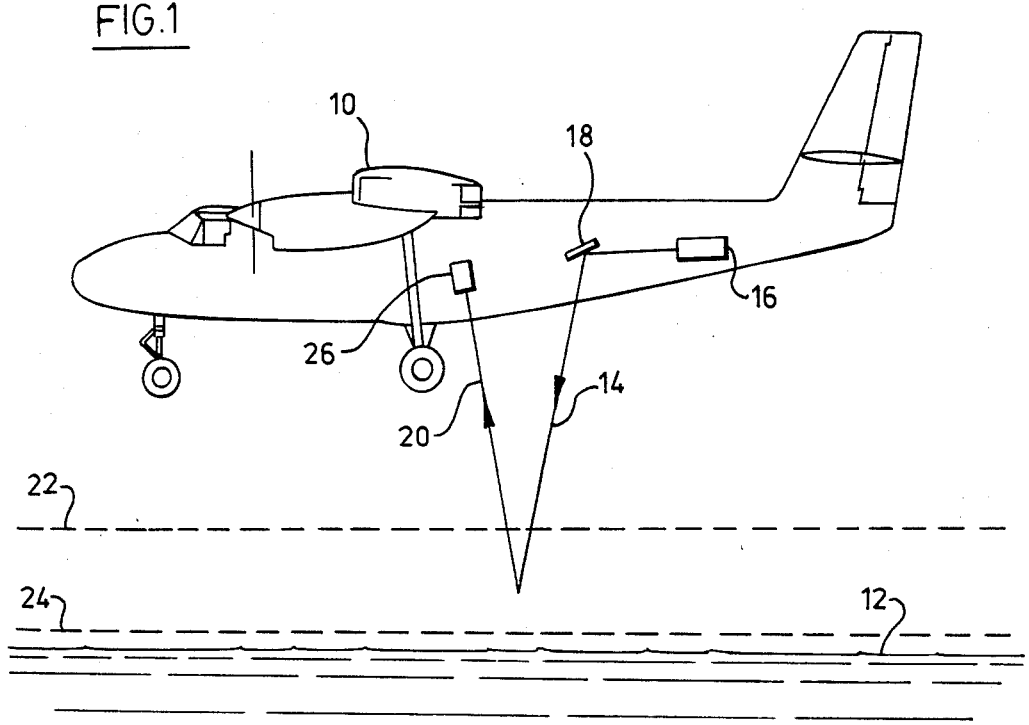
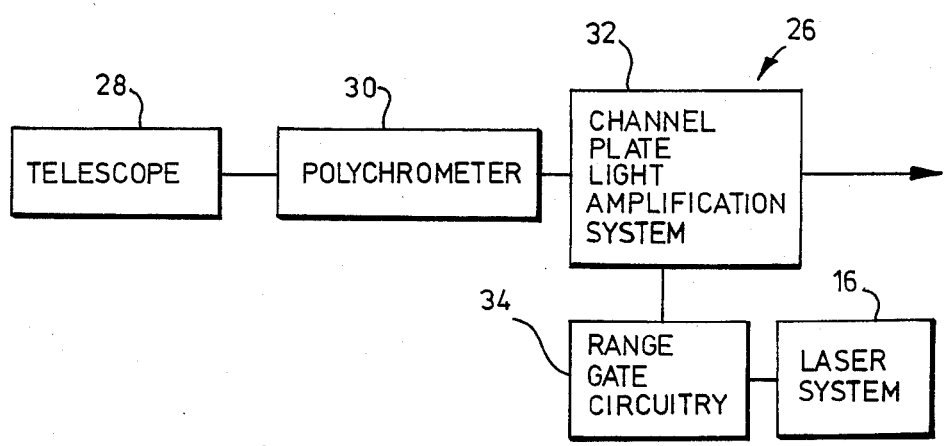
FIG.2

REMOTE DETECTION OF HYDROCARBON SEEPS

The invention relates to method and apparatus for detecting hydrocarbon gas seeps in marine and overland environments. Although the invention will be described in detail in a marine application, it will be apparent from the discussion below of the characteristics of gas seeps within earth, that methods and apparatus of the present invention can be used in an analagous manner in overland applications.

Hydrocarbon gases are known to seep from microfractures and faults in an area of ocean floor overlying an accumulation of oil or gas. The bubble plumes created by such escaping hydrocarbon gases tend to drift almost vertically from the ocean floor, and when detected near the ocean surface provide a good indication of the location of subsurface deposits. The phenomenon of hydrocarbon seeps rising from subsurface gas deposits has been previously investigated, and is described in greater detail in my U.S. Pat. No. 3,961,187 which was issued on June 1, 1976.

Hydrocarbon gas seeps characteristic of subsurface oil and gas deposits entrain dissolved and particulate materials that distinguish such gas seeps from other gases commonly rising from the ocean floor, such as carbon dioxide and biogenically generated methane. These distinguishing materials include certain aromatic hydrocarbons, and also particles of enriched organic materials produced by micro-organisms which commonly feed upon the escaping hydrocarbons near the sea bottom. My above-mentioned U.S. patent discloses a method for detecting these materials and consequently the associated hydrocarbon gas seeps.

The method involves directing an intense beam of primary light radiation toward the sea surface to induce secondary light radiation (namely, fluorescence) in the dissolved and particulate matter entrained by the gas seeps. The secondary light radiation so induced is detected with a detector range-gated to respond only to secondary light radiation generated in a predetermined zone beneath the sea surface so that radiation reflecting from the sea surface does not interfere with the detection of the fluorescence. The detected secondary light radiation is then subjected to spectral analysis to confirm or deny the presence of materials characteristic of gas seeps emanating from subsurface deposits. This detection procedure can be performed aboard a seagoing craft or preferably aboard an aircraft.

The present invention provides a method of detecting hydrocarbon gas seeps which can be used alone, or in conjunction with the above-described method to corroborate the existence of a gas seep. In marine applications, the method exploits the fact that gas bubble plumes rising to the sea surface tend to concentrate particulate and surfactant materials at the air/water interface of the sea and tend to eject microjets of water containing the concentrated material into the overlying atmosphere to form aerosols. Experimental work has shown an anomalous generation of hydrocarbon-rich aerosols above seas overlying known subsurface oil and gas deposits.

The present method involves interrogating aerosols formed above a sea or earth surface with an intense beam of primary light radiation from an artificial source, such as a pulsed laser carried aboard an aircraft or other vehicle. The spectral composition of the beam is selected so that secondary light radiation is caused in hydrocarbon materials contained within or upon the aerosols. The secondary light radiation is detected aboard the aircraft and subjected to spectral analysis to determine whether the hydrocarbon composition of the aerosols is characteristic of aerosols created by gas seeps emanating from a subsurface oil or gas deposit.

In order to separate the primary light radiation reflected by aerosols and the secondary light radiation generated by fluorescence in the aerosols from the primary light radiation reflected from an ocean or an earth surface and the secondary light radiation generated at the surface, range-gating procedures are used, and in particular lasers having pulse lengths of typically less than 20 nanoseconds are used. Optical filtering means cannot be used alone to separate aerosol from surface light radiation since there are no unique characteristics in their respective spectral contents which allow them to be separated by such optical filtering means. However, separation may be readily carried out in the time domain because of the difference in propagation times involved for the laser beam to travel down to a predetermined zone above the surface where the aerosols are for the most part located, as compared with the time taken to travel down to the surface itself and return to the aircraft. The method of separation is known as range-gating and is a processing technique commonly used in radar systems.

As used herein, the term "primary light radiation" refers to light generated by an artificial light source such as a laser, and the term "secondary light radiation" refers to light emanating from the aerosols interrogated and attributable primarily to fluorescence induced by the primary light radiation.

The invention will be better understood with reference to drawings in which:

FIG. 1 is a diagrammatic representation of an aircraft craft carrying apparatus for detecting hydrocarbon seeps according to the method of the invention; and, FIG. 2 is a block diagram of apparatus for detecting and analyzing secondary light radiation emanating from aerosols.

Reference is made to FIG. 1 which illustrates an aircraft 10 flying over the surface 12 of the sea at an altitude of about 1,000 feet. A beam of primary light radiation 14 is generated by a pulsed ultraviolet laser system 16, and the beam is directed by a mirror 18 towards the sea surface 12, and more particularly towards a predetermined zone above the sea surface 12. The predetermined zone is bounded by an upper horizontal plane 22 and a lower horizontal plane 24, which are represented in edge view by the dashed lines of FIG. 1. A ray 20 of secondary light radiation induced by the beam of light 14 in aerosols (not illustrated) is shown emanating from the predetermined zone. A detecting system 26 receives the ray 20 and assists in performing a spectral analysis of the ray 20.

A block diagram representation of the detection system 26 is provided in FIG. 3. A telescope 28 receives secondary light radiation which is then directed onto a large apertured polychromator 30. The polychromator 30 employs a prism or a diffraction grating having very low scattering characteristics in the ultraviolet spectral region to disperse the detected light radiation. The spectrally dispersed radiation is then directed onto a channel plate light amplification system 32 that intensifies the detected optical signal and provides a multichannel readout that is effectively responsive to a series of optical bands. These optical bands are selected to lie at predetermined wavelengths spaced through the ultraviolet invisible spectrum. Separation of the optical bands is achieved by integrating a spectral mask with the channel plate light amplification system 32 and registering this mask appropriately in the image plane of the polychromator 30. This spectral mask effectively isolates spectral components of the secondary light radiation generated by aerosols over the ocean surface, and which specifically characterize the presence of material associated with hydrocarbon gas seeps. The primary light radiation reflected back to the detection system by the aerosol is also separated and measured, and may be used as a normalizing parameter so that the secondary light radiation per unit surface area of aerosol that is reflecting the primary radiation may be determined.

The detection system 26 includes electronic range-gating circuitry 34 which effectively defines the position of the zone in which secondary light radiation is detected. The range-gating circuitry 34 feeds gating pulses of predetermined width to the light amplifier 32. The gating pulses activate the amplifier 32 to amplify the light signal which is received from the polychromator 30, the amplifier being inoperative except during the period of the gating pulses. The range-gating circuitry 34 detects the generation of a light pulse and in turn generates a single gating pulse of predetermined duration commencing a predetermined time after the occurrence of the light pulse. The time interval between the light pulse and the gating pulse corresponds to the combined travel time of the primary light pulse to the predetermined zone and the return travel time of any secondary light radiation induced in the predetermined zone, and effectively determines the position of the lower horizontal boundary plane 24. The duration of the gating pulse in turn determines the effective height of the detection zone, the distance between the upper and lower boundary planes 22, 24.

In practice, the hypothetical lower boundary plane 24 will be positioned as close to the sea surface as possible in order to detect aerosol response immediately above the sea surface 12, but sufficiently high that reflected return and any induced response from the sea surface 12 is not detected. If the sea surface 12 is particularly turbulent, then the lower boundary plane 24 will be positioned above the level of the turbulence, and it will consequently be apparent that the interrogation of aerosols will be most effectively performed when the sea surface is relatively calm. The hypothetical upper boundary plane 22 will be positioned sufficiently high to capture secondary light radiation emanating from aerosols at a distance of a few meters above the sea surface.

Rather than preselecting the time interval between the light and gating pulses, the range-gating circuitry 34 can be coupled to an altimeter so that the detection zone can be maintained in a predetermined position despite variations in the altitude of the aircraft. The altimeter would regulate operation of the range-gating circuitry to effectively vary the time interval between the light and gate pulses directly with the distance to the sea surface 12 (and consequently with the distance to the detection zone). In a preferred mode of operation, the laser pulse can itself be used as an optical altimeter to determine height above the ocean surface. The primary light radiation will generally be selected to lie in the ultraviolet range as such light tends to induce fluorescence in the types of hydrocarbons being detected. A suitable light source is a nitrogen laser adapted to generate two nanosecond light pulses with a peak power of one megawatt and an operating wavelength of 338 nanometers. A preferred light source is a krypton fluoride laser adapted to generate about 10 nanosecond light pulses with a peak power of 25 megawatts and an operating wavelength of 248 nanometers. The light generated by such lasers tends to produce intense excitation of fluorescent and bioluminescent response from typical hydrocarbon materials which are to be detected.

In typical applications, the airplane 10 will be flown over an area of the sea along a systematic grid pattern of parallel lines. The information gathered by the detecting system 26 respecting the composition of aerosols at the sea surface will typically be recorded in digital form on magnetic tape along with positional data. This information will then be digitally processed to produce maps showing the distribution and concentration of aerosols and fluorescent aerosols, and the ratio of these parameters in order to indicate the presence of anomalous accumulations of aerosols rich in hydrocarbon related materials.

As mentioned above, the detection method of the present invention can be combined with that of my U.S. Pat. No. 3,961,187 whereby one method can be used to corroborate the findings of the other method. To this end the range-gating circuitry 34 can be adapted to provide several zones of detection, for example, one range below the sea surface, one at the sea surface, and another above the sea surface where aerosols are formed. The information so gathered can then be pooled together with positional information to provide a more complete survey of a sea surface overlying a potential subsurface oil or gas deposit.

The use of a pulsed laser has been described so far; however, it will be appreciated that it is possible to use a frequency modulated laser beam providing that frequency modulations in the frequency range of hundreds of megaHertz are used. The methods of separating signals from different ranges that can be used are precisely analagous to the comparison between pulsed radar altimeters, as commonly employed in aircraft, and frequency modulated radar altimeters. The signal processing methods used to translate from time domain systems to frequency domain systems are well known to those skilled in the art and will not, therefore, be described in this disclosure.

It will also be appreciated that the lasers described in this disclosure are those that are available at the time of filing of this patent. New lasers may well be developed which provide for greater flexibility in the choice of wavelength employed. As the state of the art in lasers improves, it will become feasible to make the obvious step of using a plurality of primary light radiation wavelengths in order to achieve greater discrimination for the fluorescent characteristics of aerosols that are indicative of the presence of hydrocarbon seeps.

Although the invention has been described primarily with reference to the detection of aerosols formed at the ocean surface above hydrocarbon gas seeps, it also has overland applications as well. It has been noted that anomalous ultraviolet fluorescence can occur in particulate matter occurring in the surface microlayer of soils and vegetation above oil and gas fields. Such material appears to be generated by the upward migration and flux of hydrocarbon gases through the earth's surface, giving the surface over oil and gas fields certain unique characteristics. Such particulate material is lifted into the overlying atmosphere where there is strong thermal mixing of the atmosphere at the earth's surface. Such mixing occurs, for example, when the earth's surface is illuminated by strong sunshine, giving rise to a surface temperature of soils and vegetation which is substantially higher than the ambient air immediately above this surface. Under such conditions, strong convective currents of air rising from the surface levitate particulate material into the atmosphere, including the fluorescent particulates that are found to occur over oil and gas fields. The present invention can be used to separately detect this fluorescence and isolate it from the fluorescent signals arising from vegetation and mineral materials lying at the surface. In other words, rising particulate material has unique characteristics which can be isolated by range-gating once such particulate material has been lifted a sufficient distance above the earth's surface. In practice, distances of 10 meters are quite adequate to achieve the separation using existing lasers, and the technique employed is identical to that already described for use over the ocean.

I claim:

1. A method of interrogating aerosols formed above a sea or earth surface to detect hydrocarbon gas seeps below the surface, comprising the steps of:

generating a beam of primary light radiation and directing the beam towards the surface, the beam being sufficiently intense and of such a spectral composition that the beam causes the aerosols to emit secondary light radiation;

detecting the secondary light radiation emanating from the aerosols; and, analysing the spectral content of the detected secondary radiation to determine whether the composition of aerosols indicates the existence of a hydrocarbon gas seep.

2. The method of claim 1 in which the beam of primary light radiation comprises a series of light pulses, and in which the secondary light radiation is detected during a time interval of predetermined duration commencing a predetermined time after the occurrence of each light pulse, whereby only secondary light radiation originating in some predetermined zone above the surface tends to be detected.

3. The method of claim 2 in which the beam of primary light radiation is generated with a nitrogen laser producing light pulses having a spectral component with a wavelength of about 338 nanometers.

4. The method of claim 2 in which the beam of primary light radiation is generated with a krypton fluoride laser producing light pulses having a spectral component with a wavelength of about 248 nanometers.

5. Apparatus for detecting hydrocarbon seeps in a sea or in earth by interrogation of aerosols formed above the sea or earth surface, comprising: p1 means for generating a beam of primary light radiation and directing the beam towards the surface, the beam being sufficiently intense and of such a spectral composition that the beam causes the aerosols to emit secondary light radiation;

means for detecting the secondary light radiation, including range-gate means for regulating operation of the detecting means so that only secondary radiation from sources in some predetermined zone above the surface containing aerosols tends to be detected; and, spectral analysis means for use in analysing the spectral content of the detected secondary radiation whereby a determination can be made whether the composition of the aerosols indicates the existence of a hydrocarbon gas seep.

6. Apparatus as claimed in claim 5 in which the beam of primary light radiation comprises a series of light pulses, and the range gate means activate the detecting means to respond to the secondary light radiation during a time interval of preselected duration commencing a pre-selected time after the occurrence of each light pulse whereby only secondary light radiation occurring in the predetermined zone above the surface tends to be detected, 7. Apparatus as claimed in claim 6 in which the detecting means comprise:

telescope means for receiving the secondary light radiation;

means for producing a spectral dispersion of the received secondary light radiation;

amplification means responsive to the spectral dispersion for producing signals indicative of the spectral content of the spectral dispersion, the amplification means being gated by the range gate means to produce the signals indicative of spectral content only during the time interval of preselected duration.

8. Apparatus as claimed in claim 7 in which the means for generating the beam of primary light radiation comprise a nitrogen laser that produces light pulses having a spectral component with wavelength of 338 nanometers.

9. Apparatus as claimed in claim 7 in which the means for generating the beam of primary light radiation comprise a krypton fluoride laser that produces light pulses having a spectral component with wavelength of 248 nanometers.

10. A method of detecting hydrocarbon gas seeps in the sea, comprising the steps of:

generating a beam of primary light radiation and directing the beam towards the sea surface, the beam being sufficiently intense and of such a spectral composition that the beam causes aerosols formed above the sea surface by hydrocarbon gas seeps to emit secondary light radiation;

detecting secondary light radiation emanating from a region above the sea surface containing aerosols; and, analysing the spectral content of the detected secondary light radiation to determine whether the composition of the aerosols above the sea surface indicates the existence of a hydrocarbon gas seep.

11. The method of claim 10 in which the beam of primary light radiation comprises a series of light pulses, and in which the secondary light radiation is detected during a time interval of predetermined duration commencing a predetermined time after the occurrence of each light pulse, whereby only secondary light radiation originating in some predetermined zone above the surface tends to be detected.

12. The method of claim 11 in which the beam of primary light radiation is generated with a nitrogen laser producing light pulses having a spectral component with a wavelength of about 338 nanometers.

13. The method of claim 11 in which the beam of primary light radiation is generated with a krypton fluoride laser producing light pulses having a spectral component with a wavelength of about 248 nanometers.

14. Apparatus for use in detecting hydrocarbon seeps in the sea, comprising:

means for generating a beam of primary light radiation and directing the beam towards the surface, the beam being sufficiently intense and of such a spectral composition that the beam causes aerosols formed above the sea surface by hydrocarbon gas seeps to emit secondary light radiation;

means for detecting the secondary light radiation, including range-gate means for regulating operation of the detecting means so that only secondary radiation from sources in a predetermined zone above the surface containing aerosols tends to be detected; and, spectral analysis means for use in analysing the spectral content of the detected secondary radiation whereby a determination can be made whether the composition of the aerosols indicates the existence of a hydrocarbon seep.

15. Apparatus as claimed in claim 14 in which the beam of primary light radiation comprises a series of light pulses, and the range-gate means activate the detecting means to respond to the secondary light radiation during a time interval of preselected duration commencing a preselected time after the occurrence of each light pulse whereby only secondary light radiation occurring in the predetermined zone above the surface tends to be detected.

16. Apparatus as claimed in claim 15 in which the detecting means comprise:

telescope means for receiving the secondary light radiation;

means for producing a spectral dispersion of the received secondary light radiation;

amplification means responsive to the spectral dispersion for producing signals indicative of the spectral content of the spectral dispersion, the amplification means being gated by the range-gate means to produce the signals indicative of spectral content only during the time interval of preselected duration.

17. Apparatus as claimed in claim 16 in which the means for generating the beam of primary light radiation comprise a nitrogen laser that produces light pulses having a spectral component with wavelength of 338 nanometers.

18. Apparatus as claimed in claim 16 in which the means for generating the beam of primary light radiation comprise a krypton fluoride laser that produces light pulses having a spectral component with wavelength of 248 nanometers.

* * * * *